United States Patent [19]

Breaux

[11] Patent Number: 5,106,233
[45] Date of Patent: Apr. 21, 1992

[54] HAZARDOUS WASTE CONTAINMENT SYSTEM

[76] Inventor: Louis B. Breaux, 4000 Davey St., New Orleans, La. 70122

[21] Appl. No.: 398,613

[22] Filed: Aug. 25, 1989

[51] Int. Cl.$^5$ .................. C02F 11/12; E02D 27/00
[52] U.S. Cl. ................... 405/128; 405/267; 405/278
[58] Field of Search .............. 405/267, 266, 278, 281, 405/294, 128, 129

[56] References Cited

U.S. PATENT DOCUMENTS

| | | | |
|---|---|---|---|
| 785,274 | 3/1905 | Schleussner | 405/280 |
| 910,421 | 1/1909 | Schlueter | 405/278 |
| 2,101,285 | 12/1937 | Stevens. | |
| 2,232,845 | 2/1941 | Fieroh | 405/278 X |
| 2,937,065 | 5/1960 | Harza. | |
| 2,961,731 | 11/1960 | Buzzell et al. | |
| 3,302,412 | 2/1967 | Hunsucker | 405/278 |
| 3,326,003 | 6/1967 | Marconi | 405/267 |
| 3,411,305 | 11/1968 | Cella. | |
| 3,422,627 | 1/1969 | Courte | 405/267 |
| 3,839,871 | 10/1974 | Dyer et al. | 405/267 |
| 3,848,855 | 11/1974 | Weiland | 256/73 |
| 3,886,705 | 6/1975 | Cornland | 52/586 |
| 4,358,221 | 11/1982 | Wickberg | 405/128 |
| 4,453,366 | 6/1984 | Piccagli | 405/267 X |
| 4,519,729 | 4/1985 | Clarke et al. | 405/267 X |
| 4,601,615 | 7/1986 | Cavalli | 405/267 |
| 4,808,039 | 2/1989 | Fischer | 405/281 |

FOREIGN PATENT DOCUMENTS

| | | | |
|---|---|---|---|
| 455857 | 3/1950 | Italy | 405/267 |
| 0070322 | 1/1981 | Japan | 405/267 |
| 0033640 | 2/1983 | Japan | 405/267 |

Primary Examiner—Dennis L. Taylor
Attorney, Agent, or Firm—C. Emmett Pugh

[57] ABSTRACT

A hazardous waste containment system for preventing the lateral migration of hazardous fluid substances (including both liquid and gas wastes) into the water table, particularly for sites which are located over a fluid impermeable strata of clay (20) or the like. The system uses an encircling (FIG. 7) barrier containment wall comprising a plurality of slidingly engaged, interlocked, vertical barrier members (3) which extend down to and sealingly interface with the underlyng fluid impermeable strata. The barrier members are slidingly engaged via interlocking male and female appendages (1 and 4), which mate and form a vertically extended chamber (33), which a fluid impermeable seal (7) is formed. A method for implementing the invention where caving is a problem includes the augured excavation of a series of adjacent, overlapping, vertical holes (18, 18a) of prescribed depth and width and/or diameter in the soil surrounding the area to be contained and extending down to the underlying strata, installing the vertical barrier wall in the holes, and sealing the joints formed by each connection and back-filling the holes. Two and three slotted guide boxes (15; FIG. 1; FIGS. 8c and 8d) are used to position and join adjacent sets of barrier members and prevent caving in of the surrounding soil. The method further includes the utilization of a sealant (25) at the base of the containment wall to prevent leaching under it (FIG. 2). The systems may be used to contain a variety of materials and may be implemented in various soil conditions with similarly successful results.

9 Claims, 8 Drawing Sheets

HAZARDOUS WASTE CONTAINMENT SYSTEM

BACKGROUND OF THE INVENTION

1. Field of Invention

The present invention relates principally to hazardous waste containment systems and more particularly to a method for preventing the migration and leaching of hazardous fluid substances into the water table, and apparatus used in conjunction therewith.

The present invention teaches an apparatus for providing a containment wall comprising a plurality of slidingly engaged, interlocked vertical barrier members. The barrier members are engaged via interlocking connectors, which include therein a means for forming a fluid impermeable seal.

The preferred method for implementing the invention includes the preparation of vertical openings of prescribed depth, width, and/or diameter in the soil surrounding the area to be contained, installation of the vertical barrier or containment wall, and engaging sealant means, filling cores of the barrier members, and backfilling.

The present invention may be used to restrain the lateral migration of a variety of materials, both liquid and gas, and may be implemented in various soil conditions with similarly successful results.

The system of the present invention provides an efficient and cost effective containment system, as will be shown infra.

An alternative embodiment of the method of the present invention includes the engagement of the barrier members and welding of the interlocked connection at the joint formed by the mating interlocking parts to facilitate greater structural integrity and a greater sealing capability.

Another alternative method of installing the present system includes the utilization of a guide box template/anti-caving system for properly aligning the barrier members and provides a means of installation where soil conditions are such that there is a likelihood for cave in.

2. Prior Art & General Background

As may be determined by a review of the below cited patents, the prior art has failed to contemplate a system as taught in the present invention. Further, the patents cited below are fully distinguishable in construction and use, and are cited only as being at best remotely pertinent to the claimed invention.

A list of prior patents which may be of interest is presented below:

| U.S. Pat. No. | Patentee(s) | Issue Date |
| --- | --- | --- |
| 2,101,285 | Stevens | 12/07/1937 |
| 2,937,065 | L. Harza | 05/17/1960 |
| 2,961,731 | Buzzell et al. | 11/29/1960 |
| 3,202,412 | Hunsucker | 02/07/1967 |
| 3,411,305 | A. Cella | 11/19/1968 |
| 3,848,855 | Wiland | 11/19/1974 |
| 3,886,705 | Cornland | 06/03/1975 |
| 4,808,039 | Fischer | 02/28/1989 |

A cursory review of the above cited patents shows that the prior art is indeed distinguishable from the present invention. Indeed most, if not all, of the cited patents are not part of the prior art of the invention but rather are from disparate, non-analogous arts.

U.S. Pat. No. 2,101,285 teaches a "tubular interlocking piling" of steel having interlocking structures incorporated therewith. The specification teaches the system as being used in the construction or reinforcement of coffer dams, bridge piers and the like. It is noted that the apparatus does not contemplate the utilization of a containment structure although it does teach implementation as a support wall for above ground construction. Further, unlike the present invention, sealing means for preventing fluid migration is not taught.

U.S. Pat. No. 3,302,412 to Hunsucker teaches "interlocking sheet piles and method of installation", including means to slidingly engage and seal the sheet piles. This system is likewise obviously distinguishable from the present invention, for a variety of reasons. The '412 patent is directed to sheet pilings for forming earthen walls or cofferdams, and is not directed to containment systems, as discussed in the present invention. Further, implementation of the system is impractical, very costly and would be highly unsuitable for use in the types of soil conditions anticipated by the system of the present invention.

For example, the scraper 24 (FIG. 3) is inadequate to remove debris from the cavity 16 while the sheet pile is being driven into the soil. The "scraped" debris would not have anywhere to go, as the tolerance of the shoe and cavity connection is too little to be expected therethrough and the debris could not be pushed through the bottom of the cavity as it is already firmly embedded in packed soil.

While the tolerance of the engagement system is too small to allow scraping of debris therethrough, it is of sufficient tolerance that it allows liberal leakage of a fluid sealant, to the point that it would be impossible to accurately project a fluid impermeable seal on a consistently monitorable basis.

The lugs 30 (FIG. 2) as taught in '412 render the system unworkable in terms of taking away the tolerance necessary for slidingly engaging the panels. The tolerance or gap between the shoe and cavity is needed to allow a smooth installation. Lastly, the construction is overly costly and highly impractical, with the necessity of multiple apertures to be fabricated therein, the alignment of apertures to both cavities, the removal and replacement of the feed tube at each driven pile, and the implementation of scrapers as taught in the specification in the field would be very difficult and time consuming. Thus, even if the system works as taught, it would be usable only with extreme cost and complexity of fabrication.

U.S. Pat. No. 3,886,705 to Cornland teaches a "Hollow Structural Panel of Extruded Plastics Material and a Composite Panel Structure Formed Thereof". The patent teaches a hollow structural panel configured to form partition walls or the like and is designed for resisting deformation due to load bearing. While '705 does teach the utilization of a rubber gasket for preventing leakage of snow, rain, or the like, this apparatus is unsuitable for utilization in conjunction with the system of the present invention. Apparently, the system of '705 would require complete fabrication above ground prior to installation, which would make the system unsuitable for use with the preferred method of the present invention.

U.S. Pat. No. 3,411,305 issued 1968 to Cella teaches a "Tubular Interlocking Piling for Wall Assemblies". A variation of sheet piling technology, this patent contemplates a system of interlocking piling components in the construction of "cofferdams, walls, dams, piers, abutments, and other types of walls where strong construction is necessary."

The '305 disclosure teaches the "tubular pile unit" of a sufficiently strong material for forming a substantial load bearing wall; it is noted that the disclosure does not teach in any manner a fluid impermeable unit. Consequently, this apparatus is likewise unsuitable for the preferred system contemplated in the present invention. Further, it is noted that load bearing is not a factor in the present invention, for which factor the '305 patent is primarily designed.

U.S. Pat. Nos. 2,937,065 and 2,961,731 teach fluid impermeable gasket systems fully distinguishable in use, method and apparatus from the present invention.

Not found during the patent search, but known to applicant, is an apparently unpatented method for containing hazardous waste. This present method of preventing the leaching of contaminated fluids from hazardous waste sites comprises the implementation of a "slurry" wall around the site. A trench is dug to a sufficient depth to contact a fluid impermeable natural earth strata, such as clay.

A problem with preparing such a trench, however, relates to the soils' cohesive strength and its propensity for "caving." This system therefore often has had to resort to expensive sheet pilings to retain and strengthen the trench walls. As the sheet pilings typically were insufficient to prevent seepage of the containment therethrough, a still more expensive medium, typically bentonite, a naturally occurring clay, was used to fill the trench. This slurry would solidify, forming a fluid impermeable subterranean "dam" for containment.

The present invention is anticipated to cost substantially less than the most cost efficient slurry wall system as it will not require sheet pilings or any other means of preventing "caving" as such means is inherent in the present system.

Other material costs of the present system are likewise significantly less, requiring as little as one-one-hundredth (1/100) of the amount of bentonite. It is noted that the bentonite costs fluctuate, but may run as high as $200.00 per ton including freight (freight on board) job site.

Likewise, the present invention does not require the utilization of piling equipment, heavy lift equipment, or extensive labor, as is necessary for implementation of the above system.

GENERAL, SUMMARY DISCUSSION OF THE INVENTION

The present invention overcomes the problems of the prior art by providing a system which is reliable, relatively economical and less hazardous.

As may be noted above, the prior art does not contemplate a relatively inexpensive yet consistently impermeable, readily implemented containment system for preventing the leaching of toxic materials from dump sites and the like.

The only method vaguely pertinent to the present invention relates to an expensive process requiring heavy machinery and costly materials; namely, the method of providing slurry wall systems having sheet pile walls.

The exemplary embodiment of the present system comprises the utilization of a plurality of barrier members, each barrier member having an extruded tubular body structure with appendages on the exterior wall at a hundred and eighty (180) degree separation from each other. The appendages are of a "male" and "female" type, respectively, and are configured to slidingly engage the barrier members longitudinally in vertical fashion.

Further, the appendages are configured with each having a slot to form a vertical, self-aligning void or chamber when they are slidingly mated with the associated appendage of another member. This vertical chamber may then be filled with a sealant to prevent leaching of migrating substances out of the containment area into the surrounding areas and thence into the ground water.

It is noted that the appendages are not limited to a hundred and eighty (180) degree separation and may be implemented in a variety of circumferentially located positions relative to the other. For example, a ninety (90) degree separation would be used for a "corner" barrier member, while a variety of other degree separations could be utilized to form a "kidney" configured containment area. Other degree separations may be utilized for forming still other geometric containment configurations. Thus, the containment system need not necessarily form a circle or rectangle, and may be configured to contain any desired layout. It is noted that the engagement appendages for all configuration barrier members are designed to mate with the appendage of other members of this invention.

The present invention of providing a vertical wall as a containment barrier is possible as the wall is implemented to a depth to intersect the clay strata in the soil, a fluid impermeable strata found at varying depths. Thus, various sites require different depths of implementation utilizing differing member lengths. Normally it is not necessary to go deeper than forty (40') feet, and, thus, conventional excavation equipment tools may be used in the present system. It is noted that clay is not the only fluid impermeable strata, and the present system may be used in conjunction with other fluid impermeable strata as well with satisfactory results.

Another step, when desirable, in the method of the present invention is the implementation of a sealing media to embed the base of the containment wall to prevent leaching thereunder.

The exemplary embodiment of this step utilizes, when desirable, the naturally occurring clay bentonite as taught in the slurry wall concept for the base sealant, but in far less amounts. The base sealant need be implemented only in an amount sufficient to embed the intersection of the wall and the strata. This may be, for example, four (4") inches. It is noted that, in some situations, this step may not be necessary.

The present system teaches an alternate or supplemental step for use where greater structural integrity of the barrier wall and/or higher sealing properties are desirable. This additional step comprises the welding of the engagement joint in the areas within the sealant chamber prior to injection of the sealant. The welding of the engagement area is performed utilizing a specially designed welding probe, which is lowered into the chamber after the barrier members have been slidingly engaged. Once the weld is complete, a sealant will be deposited or injected into the remaining void.

For installation of the present invention in soil conditions having a likelihood of "caving", the present invention teaches the implementation of a "guide box" template system extending the full depth of the excavation. The "guide box" serves five apparent purposes, to wit: 1) it provides a support structure which will restrain any caving walls of the excavation from entering the area where the members are to be installed, lessening the likelihood of complications during engagement of the barrier members; 2) it provides a template for easy engagement and proper alignment of the barrier members during installation; 3) it provides protection for previously installed members against damage from the auger (when an augured hole is desirable); 4) it acts as a guide for the auger; and 5) it can allow for gradual and controlled backfilling by being slowly extracted.

The present system contemplates excavation of the ground soil via trenching or auguring, but expressly teaches that other methods of excavation may be utilized with satisfactory results.

It is therefore an object of the present invention to provide a system for containing hazardous wastes, which is efficient, utilitarian, and cost effective, and which provides reliable protection against the threat of migrating contamination of adjacent aquifers and soil.

It is a further object of the present invention to provide a system for containing hazardous wastes, which utilizes a plurality of slidingly engaged interlocking containment members.

It is a still further object of the present invention to provide a system for containing hazardous wastes that is adaptable to a variety of dump site configurations.

It is another object of the present invention to provide a system for containing hazardous wastes which provides reliable containment for a period of time equal to or exceeding convenient methods.

It is another object of the present invention to provide a system for containing hazardous wastes until such time as it can be removed or neutralized as desired.

It is still another object of the present invention to provide a method of sealing slidingly engaged vertical barrier members, including the step of welding the engaged area via a specially designed welding probe lowered into the sealant chamber.

It is a further object of the present invention to provide a method of installing a hazardous waste containment system utilizing a plurality of vertical barrier members wherein the method includes the utilization of a "guide box" template which aids in the installation process.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 8 (comprising FIGS. 8a–d) is a series of top views illustrating the various steps in the exemplary guide box/auger hole method of installation of the present invention; wherein

FIG. 8b is a top view of the second step in a method of installing the exemplary system of the present invention, illustrating a "guide box" placed into the excavation of the step of FIGS. 8a;

DETAILED DESCRIPTION of the PREFERRED, EXEMPLARY EMBODIMENTS

Figure 1:
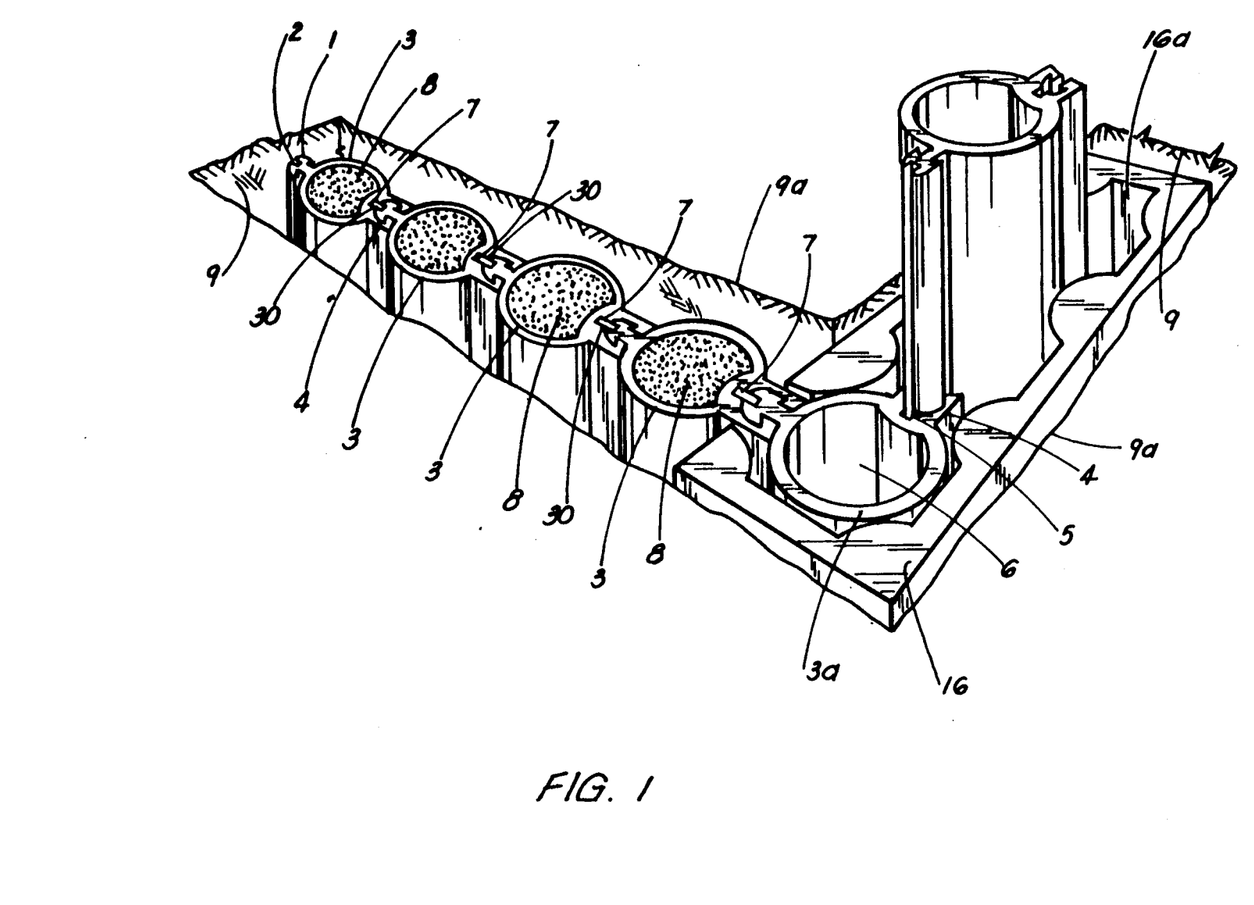
FIG. 1 is a perspective view of the preferred, exemplary embodiment of the present invention, illustrating a portion of the assembled vertical barrier wall in a pre-excavated trench, and further illustrating a vertical barrier member being slidingly engaged in place, utilizing the guide box template/apparatus and prior to the backfilling operation of the present system.

As can be seen in FIG. 1, the containment system of the present invention comprises the implementation of a plurality of adjacent, associated barrier members 3 slidingly engaged to form a subterranean, vertical barrier wall and the subsequent sealing thereof, with the wall placed in a trench 9 configured to contain the waste area. The apparatus and system of the present invention will be described in greater detail infra.

Figure 3:
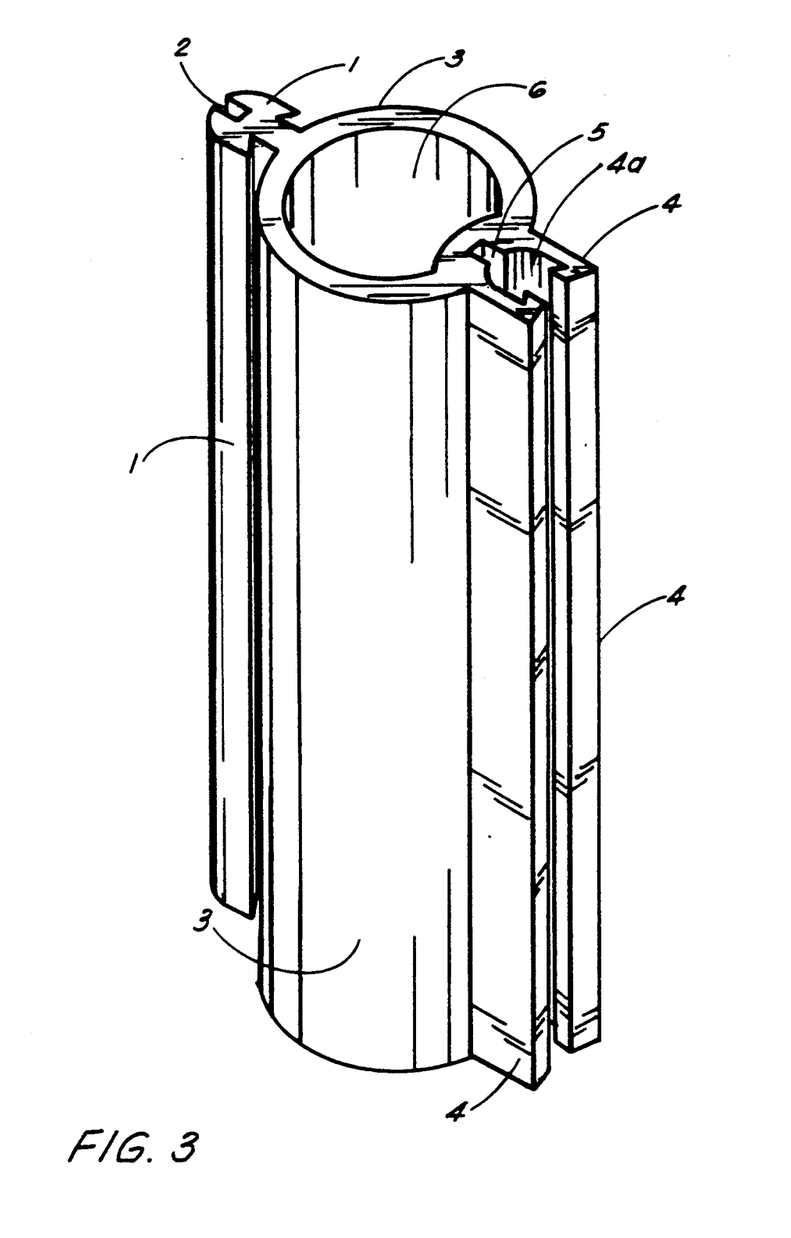
FIG. 3 is a isometric view of the exemplary vertical barrier member of the present invention, illustrating the male and female interlock exterior appendages at an exemplary one hundred and eighty (180) degree separation relative to the other.

As illustrated in FIG. 3 of the drawings, the exemplary barrier member 3 of the present invention comprises a cylindrical body made of, for example, polyethylene, polyvinyl chloride (PVC), polypropylene, polyurethane or the like. Illustrated in the present figure are two exterior appendages 1,4 at one hundred and eighty (180) degree separation from one another about the periphery of the cylindrical body. Appendage 1 comprises the male portion of an interlock system which slidingly engages and lockingly mates with a second, female appendage of an adjacent mating member to form a barrier wall.

Included with the male portion 1 is a void or slot 2 comprising a seal receptor pocket. This chamber 2 will be discussed in further detail infra.

The second appendage 4 comprises the female portion of the interlock system having an open, slotted area 4a for receiving a male portion and also includes a seal receptor pocket 5. As can be seen in the figure, the body 3 also includes an open core section 6.

Figure 4:
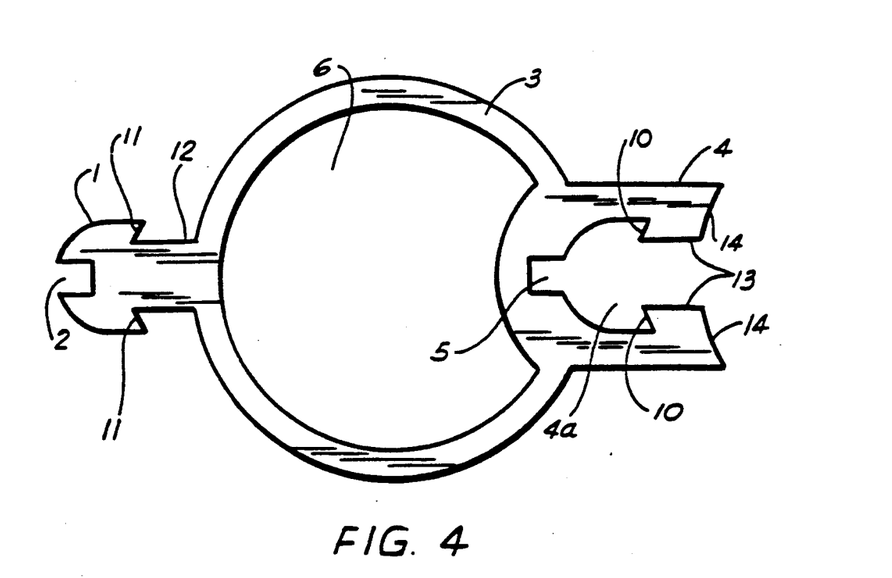
FIG. 4 is a top view of the exemplary vertical barrier member of FIG. 3, further illustrating the male and female interlock exterior appendages at the exemplary one hundred and eighty (180) degree separation relative to the other.
Figure 5:
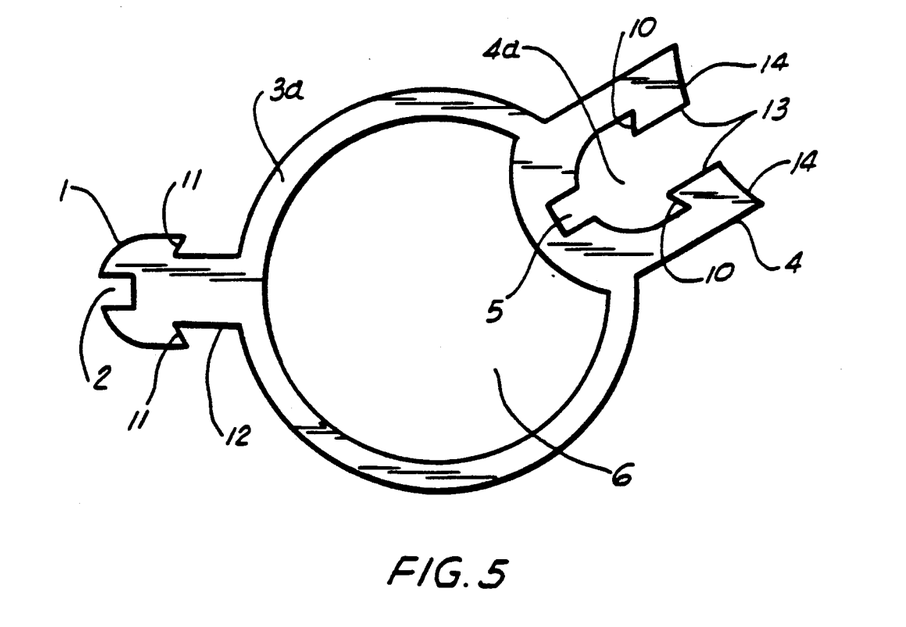
FIG. 5 is a top view of the an additional exemplary vertical barrier member of the present invention, similar to that of FIG. 3, but illustrating the male and female interlock exterior appendages at an angle other than one hundred and eighty (180) degree separation relative to the other.

FIGS. 4 and 5 illustrate in greater detail the various design features of the barrier member 3 of the present invention. In addition to a seal receptor pocket 2, the male portion 1 of the interlock system also includes an aligning shoulder 11 which slidingly communicates with the aligning shoulder 10 of the female member 4 to provide for more efficient installation with desirable tolerances, as well as providing for a medium with which a consistently fluid impermeable seal can be projected.

Male member 1 also includes an interlock neck 12, which slidingly mates with and extends through the interlock collar 13 of the female member 4.

As shown in FIG. 5, the appendages 1, 4 of the alternative, exemplary barrier member 3a may be implemented at configurations other than one hundred and eighty (180) degrees. For example, the appendages may be configured at forty five (45) degrees for the corner members to form triangular containment, or at ninety (90) degrees to form square containment or at any other desired angle.

The one hundred and eighty (180) degree configuration members 3 may be used in conjunction with members having appendage configurations 3a other than one hundred and eighty (180) degrees, thereby allowing implementation of walls other than strictly linear or ones. For example, as shown in FIG. 7, a "kidney" shaped configuration is illustrated for encapsulating a similarly configured dump site 31 with its waste 30.

Figure 7:
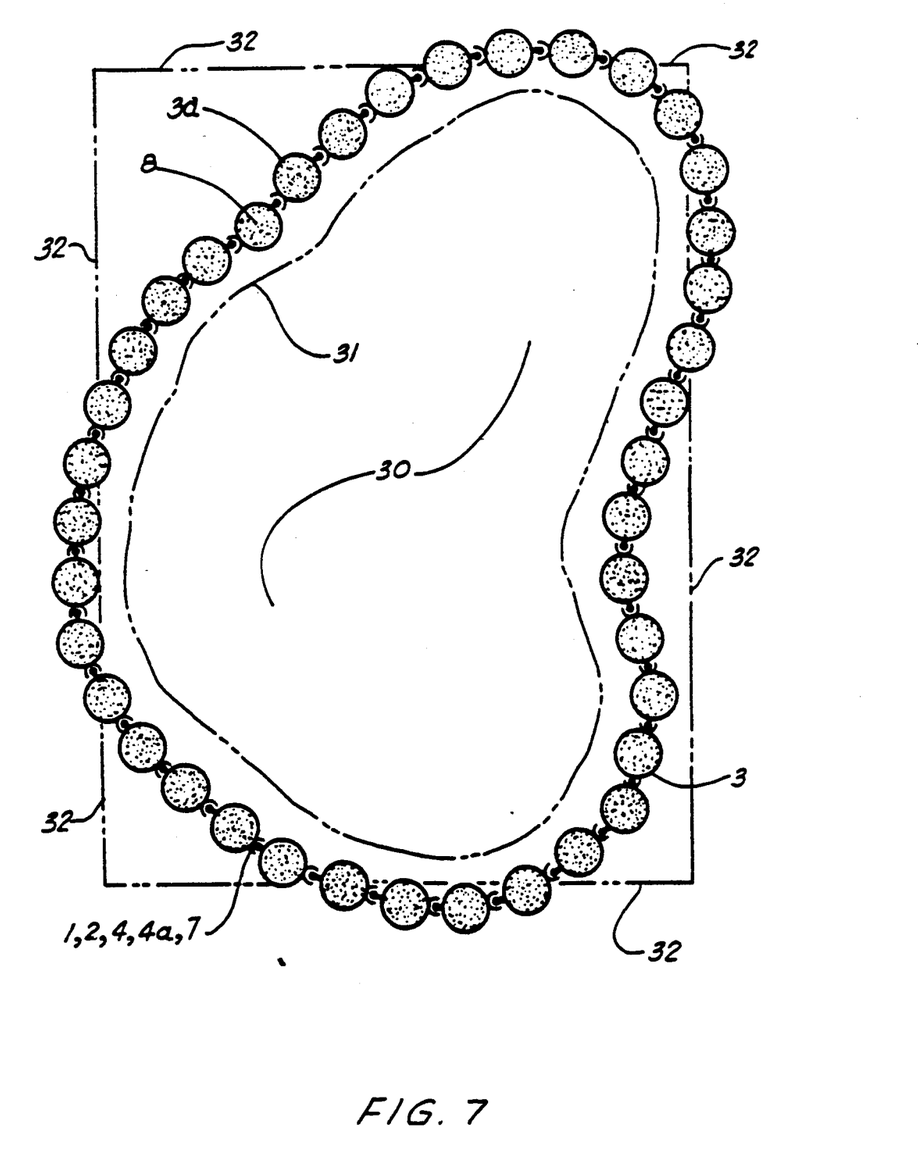
FIG. 7 is a top view of a complete, exemplary embodiment of the present system, illustrating how the system may be installed to conform to, and contain, a dump site having a non-rectangular configuration.

As further illustrated in FIG. 7, the present "slurry wall" method and/or the utilization of sheet pilings would not allow for this flexibility as to the configuration, requiring a more or less linear perimeter 32 substantially in excess of what is needed, at a greatly increased cost.

FIG. 1 illustrates an above ground view of the installation system of the present invention. The first step in the installation process is the excavation of a trench area around the periphery of the site to be contained. The trench 9 is of a sufficient width to allow placement of the vertical barrier members 3 without caving. Trench 9 must also be of sufficient depth to communicate with a fluid impermeable strata in the soil such as clay or the like.

Figure 6:
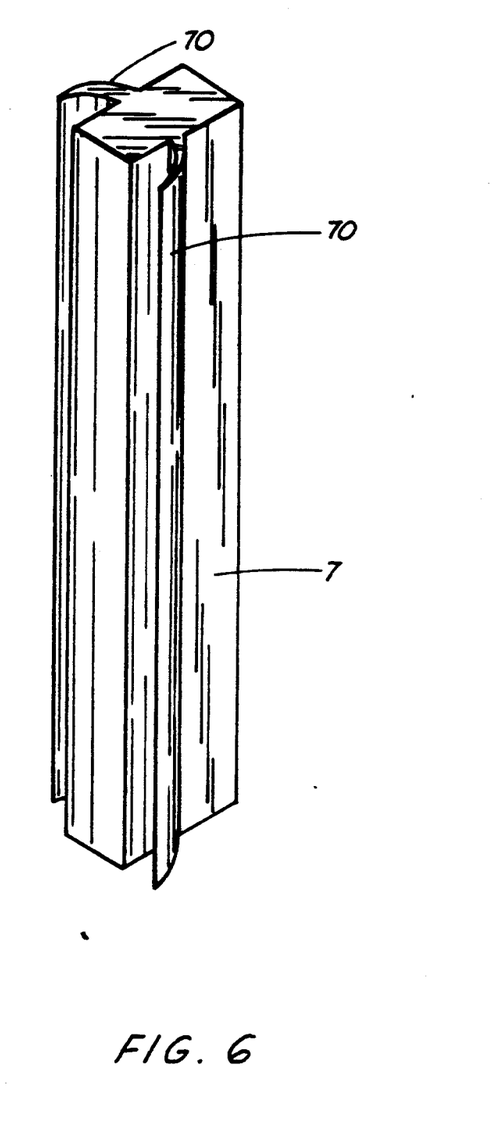
FIG. 6 is a perspective view of the solidified seal of the present invention as it might appear in the sealant cavity and the engaged appendage tolerance void after installation and where welding has not been used.

The vertical barrier members 3 may be slidingly engaged to form a barrier wall via the male and female sliding interlock appendages 1 and 4, respectively. Once the barrier members are joined, a sealant that expands and hardens to a fluid impermeable state, such as (but not limited to) silicone, may be injected into the seal receptor chamber 33. Chamber 33 is formed by the mating of slot 2 in appendage 1 and slot 5 in appendage leaving an open area formed between them. The sealant fills chamber 33 and migrates into the curved tolerance void remaining between the male 1 and interior wall of the female 4a interlocks, forming a fluid impermeable seal 7a, as illustrated in FIG. 6.

To form a corner, a member 3a having engagement appendages 1 and 4 configured at ninety (90) degrees relative to the other is used.

As further illustrated in FIG. 1, the core section 6 of the vertical barrier member body 3 may be filled with backfill, sand or the like 8 either prior to or after installation. If implemented prior to installation, the added weight can aid in the placement and engagement of the barrier members 3.

Also illustrated in FIG. 1 is the "guide box" 16 discussed in the "general discussion of the invention" section supra. The "guide box" is used where a precise alignment and/or prevention of caving is necessary, and comprises an elongated structural member configured with a plurality of slots 16a for use as a guide for the installation of the vertical barrier members. The method of installation utilizing the "guide box" will be more fully disclosed infra in connection with the discussion of FIGS. 8a–8d.

Figure 2:
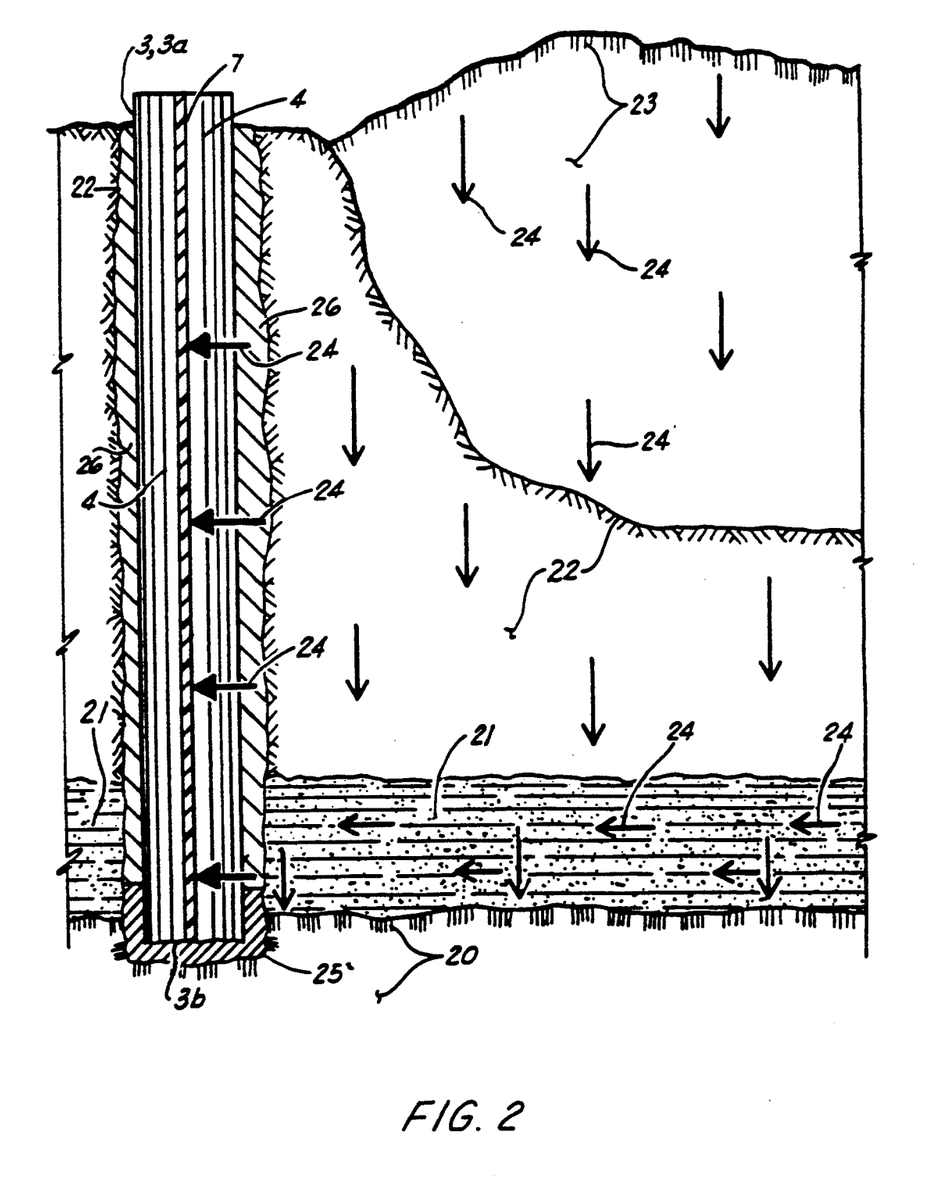
FIG. 2 is a partial, side cross-sectional view of the preferred, exemplary embodiment of the present invention, illustrating the sealant characteristics of the fluid impermeable barrier relative an exemplary migration of toxic fluid waste, further illustrating the use of a clay-like substance embedding and sealing the base of the barrier wall.

FIG. 2 is a side view of the vertical barrier member wall in its implemented state, illustrating a cross-sectional view of the present invention and containment area, showing via arrows 24 an exemplary migration of contaminants.

As shown in the figure, the containment wall is implemented vertically in a mostly subterranean manner to a sufficient depth to communicate with a fluid impermeable strata 20 such as clay or the like. The fluid impermeable vertical barrier wall system, communicating with the clay strata, forms an impregnable "container."

In the present example, toxic waste material 23 in a dump or the like contains contaminated fluids 24 or suspended material which may migrate through the natural soil 22 to the ground water aquifer 21 which, without containment, would increase its rate of migration out of the area, contaminating lakes, rivers, and the water supply. It should be noted that neither the aquifer 21 nor the contaminant 24 permeates the clay strata 20.

The present invention prevents migration of the contaminant 24 in the site, and cuts off flow of the natural aquifer 21 in the containment area.

The vertical barrier wall, with its impermeable seal 7 prevents migration of the contaminant and any tainted water in the containment site. In order to prevent leeching of the contaminant between the barrier and the clay strata 20, a layer of bentonite 25 or the like may be deposited at the base 3b of the trench prior to installation of the system. To further prevent leaching under the barrier wall, the wall may be "tapped" into the clay strata 20 a short distance to further seal the system into the underlying strata.

The excavation of a trench 9 for installation of the wall as taught in FIG. 1 infra may be satisfactorily implemented in areas with highly cohesive soils, but may not be satisfactory where the soil has a very high moisture content, is sandy or otherwise likely to "cave".

Thus, an alternative method of installation may be used where soil caving is likely to be a problem. This alternative method is critical as the excavation may have to be as deep as forty (40') feet and require that the hole be "clean" prior to installation of the vertical barrier members.

Loose sand, gravel, or the like can interfere with the engagement of the barrier members 3 Further, debris forming at the bottom of the hole during installation may tend to prevent communication of the barrier with the clay strata, thereby allowing migration of the contaminant between or below them.

It is for these reasons that an alternative method of installation has been developed which is particularly suitable for such situations This alternative method of installation is illustrated in FIGS. 8a–8d and comprises the utilization of the "guide box" apparatus referred to supra with the discussion of FIG. 1.

Figure 8A:
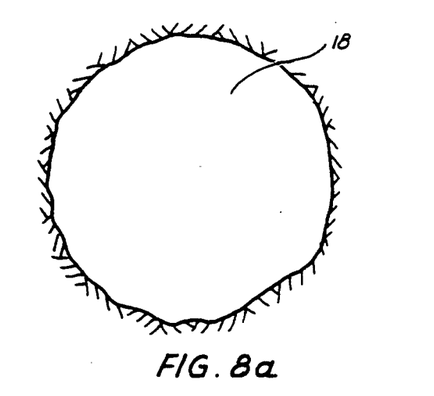
FIG. 8a is a top view of the first step representing an augured hole producing an excavation to a desired diameter and depth.

FIG. 8a illustrates the first step of the alternative method of installing the present invention, illustrating a top view of a cylindrical excavation 18 created with an auger or like device. It has been found that such an excavation is less prone to caving as compared to a vertical, rectilinear trench. This property of reduced caving is believed due to the cylindrical configuration of the excavation, which has a higher propensity for cohesiveness, and also perhaps due to the auguring operation itself, which has been found to pack the excavation walls to a greater degree than linear trenching.

Figure 8B:
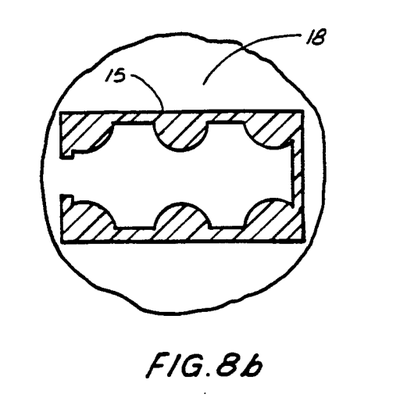
Figure 8C:
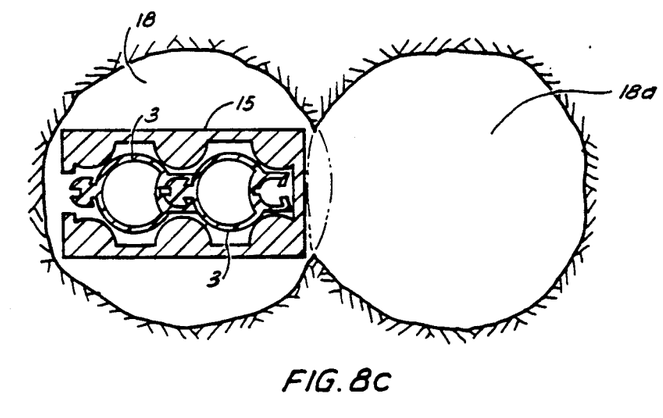
FIG. 8c is a top view of the third step in the method illustrating two interlocking members having been placed in the holes of the guide box in the initial hole along side of a newly augured hole.

A problem, however, with utilizing a plurality of augured holes is that the drilling operation, when communicating with an adjoining hole as shown in FIG. 8c, will tend to deposit soil into the new hole into the adjoining excavation.

After preparing the initial excavation with an auger, the second step in the alternative method entails depositing an initial two hole "guide box" 15. The "guide box" 15 illustrated is a "starter" design, designed to fit into the initial, augured excavation 18, and act as a template guide for two barrier members 3 to be slidingly engaged As discussed above, the "guide box" 15 also acts to guide the joining of the barrier members 3 as they engage to become a subterranean containment structure and prevent complications resulting from "caving" of the walls of the excavation.

FIG. 8c is a top view of the third and fourth step(s) of the alternative method, illustrating the installation of the barrier members 3 in the two slot starter guide box 15 and the excavation 18a of an adjoining area to the original excavation 18. The two slot guide box 15 is used initially as it fits into the excavation 18, which is of an approximate twenty-four (24") inch diameter. Barrier members 3 may be installed into the excavation area by placing the guide box 15 into the excavation area first and sliding and joining the barrier members 3 therein, or by placing barrier members 3 into the guide box 15 out of the excavation 18 and then installing the guide box 15 with the barrier members 3 therein into the excavation 18. It is noted that installing the barrier members 3 into guide box 15 out of the hole has advantages in maneuvering and general ease of placement into excavation 18.

For example, with barrier members 3 slidingly engaged in the guide box 15 while being up out of the hole, the contained barrier members 3 may be filled with sand or other fill material, giving the guide box significantly greater mass. This results in greater ease in lowering the system into the excavation and joining members in the guide box to the previously installed members, et cetera.

As can be seen in FIG. 8c, the closed end of guide box 15 faces the second excavation 18a, acting to prevent soil and the like from entering the female engagement appendage of the associated barrier member 3 and allowing for a "clean" continuation of the excavation.

Figure 8D:
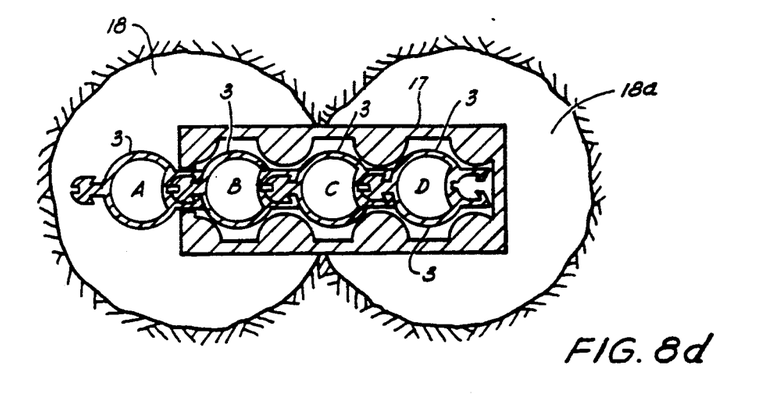
FIG. 8d is a top view of the fourth step in the method of installing the exemplary system of the present invention, illustrating the removal of the first guide box and the placement of a second guide box in such a manner as to engage one of the vertical barrier members with the installation of barrier members in the two theretofore vacant slots.

FIG. 8d is a top view of the fourth, fifth, and sixth steps in the alternative method of installing the present invention, illustrating the removal of the first, two slot "guide box", placement of a second, three slot guide box 17 in such a manner as to engage at least one of the vertical barrier members and extend into the second excavation, and further including the installation of the barrier members in the vacant slots.

As can be seen in FIG. 8d, the open end of the guide box 17 engages the joined appendages of barrier members 3A and 3B, and the closed end once again faces the next area to be excavated, near member 3D.

In continuing the process, the steps of FIGS. 8c and 8d are repeated, until the desired area is contained.

Returning to FIG. 1, a corner guide box 16 is illustrated in use in the utilization of the template or guide box method of installation in conjunction with a linear trench, as opposed to the auger excavation method detailed above. The corner guide box 16 as used in the illustration has a side opening to allow communication of the engaged barrier member appendages when at least one of said appendages is of a configuration other than one hundred and eighty (180) degrees, as in member 3a.

After the barrier members are slidingly engaged in place, the sealant chambers 33 are filled, and the hollow core 6 of the barrier member 3 is filled with sand or backfill 8. The excavation 9 surrounding the structure is then filled. It is noted that the barrier members 3 are not particularly completely covered over when the system is implemented, and it may be desirable to have the barrier wall protrude up out of the ground so as to prevent water runoff from the surface to other areas, as the runoff may contain contaminants as well. The top of barrier members 3 may also be capped to prevent the filling of the core 6 with water, as such could result in cracking or breakage of the structure if the liquid were to expand to form ice.

Figure 9:
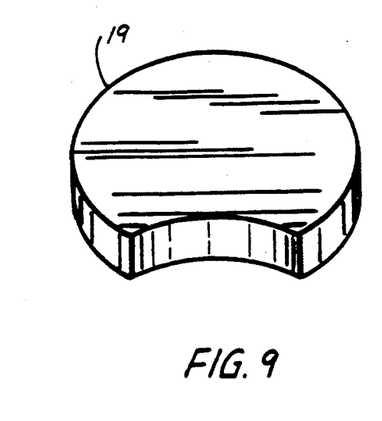
FIG. 9 is an isometric view of a plug that may be placed in the base of the core of a barrier member.

FIG. 9 illustrates a bottom plug 19 to be implemented at the base of the barrier member 3. The plug is welded 19a at the base of the hollow cavity or core 6. The plug 19 is particularly necessary when the barrier members are placed into the guide boxes and filled with sand or backfill prior to the guide box being placed into the excavation area.

Figure 10:
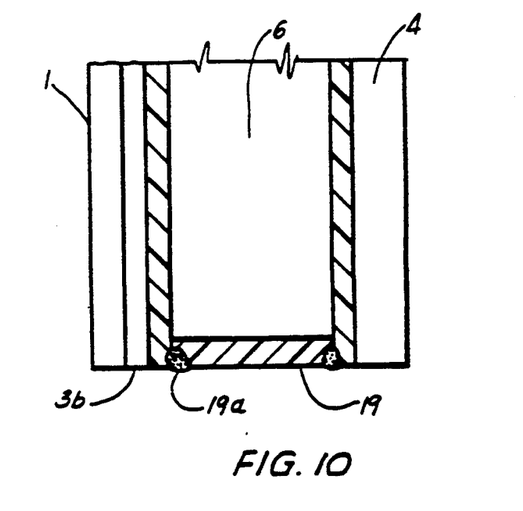
FIG. 10 is a side, vertical, cross-sectional view of the plug of FIG. 9 installed in the core of the base of a barrier member.

Plug 19 may be implemented at the very bottom of the core 6 or it may be welded a small distance up from the bottom, such as for example from a half (½") inch to about five (5") inches, so as to allow the bottom of the heavy barrier member to settle down into the clay strata, creating a better seal. The barrier members may also be tapped or vibrated to encourage further "settling" into the strata.

Figure 11:
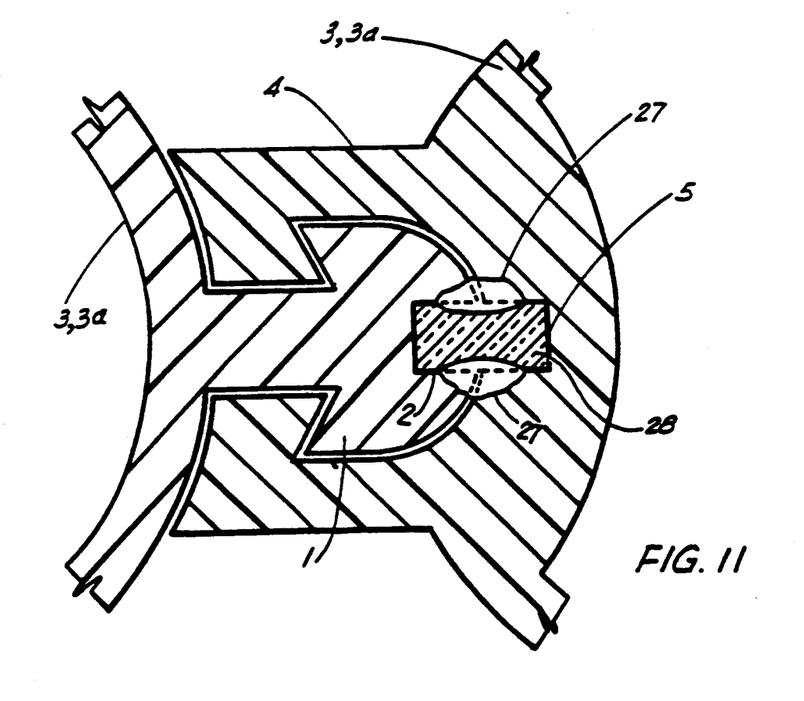
FIG. 11 is a top, horizontal, cross-sectional, partial view showing the male-female appendage engagement between adjacent, associated barrier members of the present invention and further illustrating the welding of the engagement area and sealant injected into the sealant cavity.

FIG. 11 illustrates a further alternative in the system of the present invention, detailing the location and degree of a heat seal or weld 27 implemented in the sealant pocket or cavity 5 prior to injection with sealant 28. The weld 27 acts to tighten the bond between the two appendages, essentially blocking off any tolerance between the male 1 and female 4 appendages, and increasing structural integrity by permanently bonding the barrier members 3 together.

Although the preferred application for the present invention in the containment of fluid wastes overlying a fluid impermeable strata, the invention can also be applied to other fields such as, for example, soil containment for levees, containment of solid wastes, etc.

The embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A method of producing a subterranean containment system preventing the lateral migration of fluid contaminants located over a fluid impermeable strata, comprising the following steps:
   a. making an excavation around the area to be contained of a sufficient depth to communicate with and expose the fluid impermeable strata under the contaminants and maintaining the excavation clear of soil and debris in the area in which the strata is exposed;
   b. forming a fluid impermeable barrier wall around the contaminants by slidingly engaging in a vertical manner and connecting together a series of elongated barrier members and placing them within the excavation with the bottom portions of the barrier members in sealing communication with the fluid impermeable strata and sealing off the barrier members to form the fluid impermeable barrier wall, including the sub-steps of:
      i. providing a guide box having at least one longitudinal slot formed therein,
      ii. placing said guide box in the excavation,
      iii. inserting a first elongated barrier member in said longitudinal slot formed in said guide box,
      iv. slidingly, engaging and connecting together, in longitudinal fashion, a second elongated barrier member to said first elongated barrier member, and
      v. removing said guide box from said excavation; and
   c. filling the excavation with backfill or other material and containing the contaminated area with the fluid impermeable barrier wall working in conjunction with the underlying impermeable strata.

2. The method of claim 1, wherein step "b" further includes the step of:
   depositing a fluid impermeable medium at the base of the barrier wall prior to filling the excavation in step "h", assisting in the sealing of the barrier wall to the underlying impermeable strata.

3. The method of claim 2, wherein there is included the step of using bentonite clay for the fluid impermeable medium.

4. The method of claim 1, wherein a vertically extended cavity exists between each set of adjacent, connected barrier members, and step "b" further includes the step of:
   injecting a sealant into the cavity after the barrier members have been slidingly engaged.

5. The method of claim 1, wherein step "b" further includes the steps of:
   inserting an additional barrier member into the longitudinal slot formed in said guide box and engaging it with and connecting it to said second barrier member.

6. The method of claim 5, wherein there is further included the steps of:
   i. using a second guide box having more than one longitudinal slot formed therein;
   ii. placing an additional barrier member into one of said longitudinal slots of said second guide box and engaging it with and connecting it to said third barrier member;
   iii. placing other barrier members into any remaining slots, engaging each with the preceding barrier member in the adjoining slot and connecting them together; and
   iv. lifting the second guide box out of the excavation and leaving the engaged barrier members in the excavation.

7. The method of claim 5, wherein there is further included the steps of:
   repeating step "b" including the step of claim 5 until the barrier wall has been completed and the fluid contaminants have been encircled.

8. The method of claim 1, wherein step "a" includes the step of:
   forming the excavation in stages by auguring out a first hole and then auguring out a second hole adjacent to the first with the two holes overlapping, joining them together.

9. The method of claim 8, wherein there is included the steps of:
   placing a guide box in the first hole before the second hole is made with the box having two vertical slots and at least one closed end with two barrier members being placed in the guide box; and
   making the second hole adjacent to the closed end of the guide box while the guide box is in the first hole.

* * * * *